United States Patent [19]

Jacobs, Jr.

[11] 4,084,736
[45] Apr. 18, 1978

[54] VEHICLE MOUNTED MOTORCYCLE RACK

[76] Inventor: Jacob M. Jacobs, Jr., 721 Parham St., Rocky Mount, N.C. 27801

[21] Appl. No.: 651,268

[22] Filed: Jan. 22, 1976

[51] Int. Cl.² .............................................. B60R 9/10
[52] U.S. Cl. .............................. 224/42.03 B; 214/450; 224/42.08; 224/42.44; 403/353
[58] Field of Search .................. 224/42.03 B, 42.03 R, 224/42.03 A, 42.05, 42.06, 42.07, 42.08, 42.21, 42.35, 42.43, 42.44, 29 R; 214/450–454, 75 R, 75 T, 77 P, DIG. 10; 254/45, 89 R; 403/349, 353, 92, 93, 99, 165; 248/188.2, 188.5, 224

[56] References Cited

U.S. PATENT DOCUMENTS

| 271,050 | 1/1883 | Evans | 254/89 R X |
|---|---|---|---|
| 3,100,241 | 8/1963 | Goldstein | 224/42.03 R X |
| 3,367,548 | 2/1968 | Cooper | 224/42.03 B |
| 3,528,578 | 9/1970 | Schoenberger | 224/42.44 X |
| 3,567,052 | 3/1971 | Allen | 214/450 |
| 3,796,503 | 3/1974 | Dawson | 403/353 |
| 3,931,903 | 1/1976 | Johnson | 214/450 |

Primary Examiner—Drayton E. Hoffman
Assistant Examiner—Carl Rowold
Attorney, Agent, or Firm—Shlesinger, Arkwright, Garvey & Dinsmore

[57] ABSTRACT

A readily assembled and self-contained motorcycle rack assembly raises a motorcycle from ground level to a stored position on the carrying vehicle. A unique hinged socket connection and an adjustable contour bumper engaging assembly makes it possible to quickly install the rack. It has two inverted simultaneously operable ratchet type jacks which raise the rack assembly and coact with a retention bar to bring the motorcycle and rack assembly into a fixed locked position on the carrying vehicle.

12 Claims, 4 Drawing Figures

VEHICLE MOUNTED MOTORCYCLE RACK

BACKGROUND OF THE INVENTION

This invention relates to racks for mounting and carrying motorcycles on other vehicles.

The prior art shows a variety of devices for this purpose. Since a motorcycle generally is too heavy to be manually lifted, it is necessary to provide some sort of lifting mechanism to raise the motorcycle into a carrying position. This requirement often has resulted in cumbersome and mechanically intricate devices. Such intricate devices are often not disassemblable so they cannot be stored when not in use. Prior art devices also have not provided fittings by which simple adjustments will allow the same rack to be easily adapted for use on different vehicles.

SUMMARY OF THE INVENTION

A feature of this invention is a structurally simple and easily manageable motorcycle rack.

An additional feature of the invention is a rack which is easily assembled and disassembled so that it may be stored when not in use.

Further features of the invention are fittings for connecting the rack to the carrying vehicle which are easily adapted for use on different vehicles.

Another feature of the invention is a locking arrangement which secures the motorcycle more closely and rigidly to the rack as it is raised into position.

The motorcycle rack comprises a motorcycle support means having a track on which a motorcycle is supported in an upright position, a connector or coupling means for pivotally and removably interlocking the motorcycle support means with the carrying vehicle, lifting means connected to the motorcycle support means for raising the motorcycle support means, and bumper engaging means for removably attaching the lifting means to a bumper of the carrying vehicle.

The connector means may include a socket and insert type hinge.

The bumper engaging means may include a grasping device and a plurality of interconnected hinged brackets connected to each other and the grasping device in series.

The lifting means may include a plurality of standard automobile jacks interconnected by lanyards so that they may be manipulated simultaneously.

Also included is a motorcycle retention means, connected to the lifting means and removably attachable to a point on the upper portion of a motorcycle to be carried, for moving the motorcycle into a closer, more fixed position relative to the carrying vehicle as the motorcycle is raised from ground level into a carrying position.

DESCRIPTION OF THE INVENTION

Figure 1:
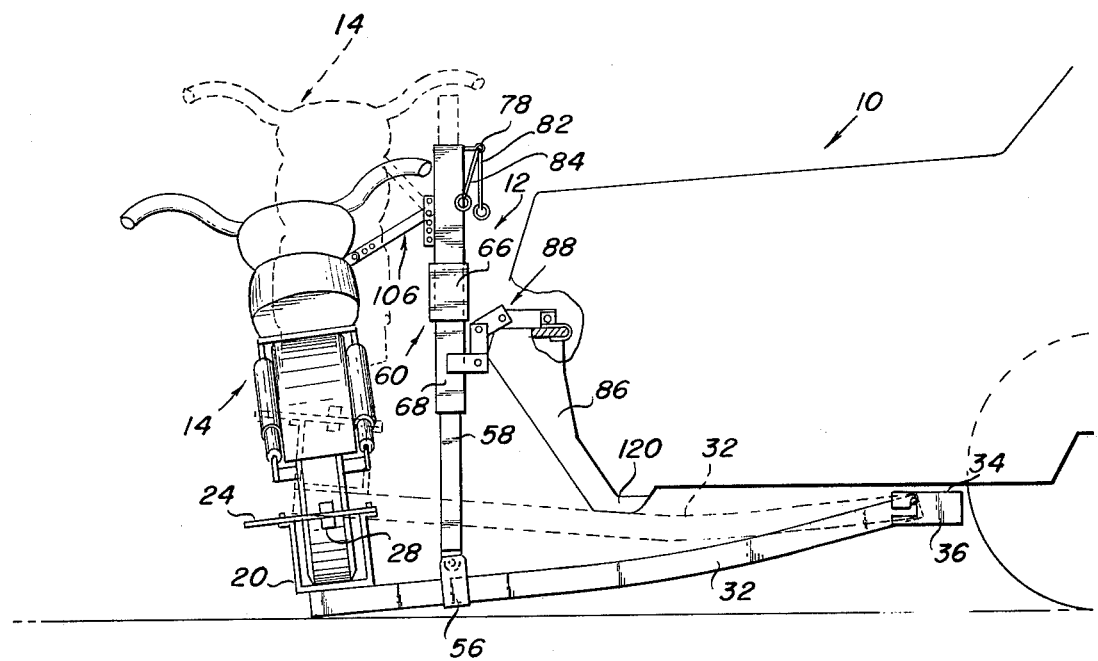
FIG. 1 is a side elevation of the motorcycle rack of this invention shown mounted on the rear of a carrying vehicle with a motorcycle loaded thereon.
Figure 2:
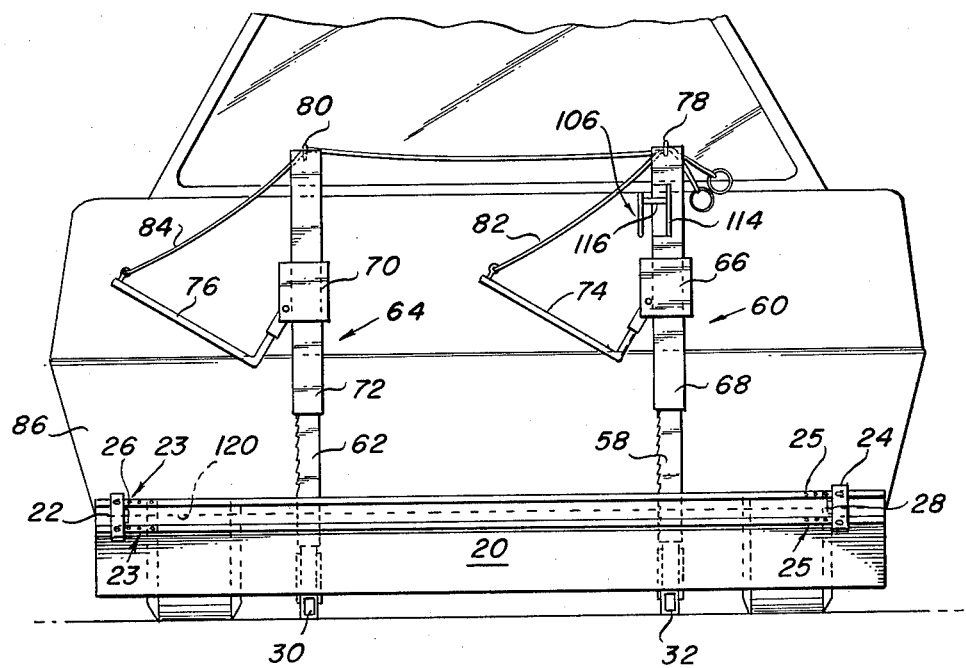
FIG. 2 is a rear elevation of the motorcycle rack mounted on a carrying vehicle.

FIG. 1 shows the rear of a vehicle 10 upon which the motorcycle rack 12 of this invention is mounted. A motorcycle 14 is loaded on the rack. The rack and motorcycle are shown in both a lowered loading position and in a raised carrying position.

The rack has a U-shaped track 20 in which the wheels of the motorcycle are positioned. Located at each end of the track 20 are hinged bars 22 and 24 which may be swung out of the way for loading and unloading or locked in position across the mouth of the track to prevent the motorcycle's rolling out. The distance between these bars 22 and 24 may be adjusted by repositioning the bars using the apertures at 23 and 25. The bars may have angled plates 26 and 28 situated thereon.

Figures 3, 4:
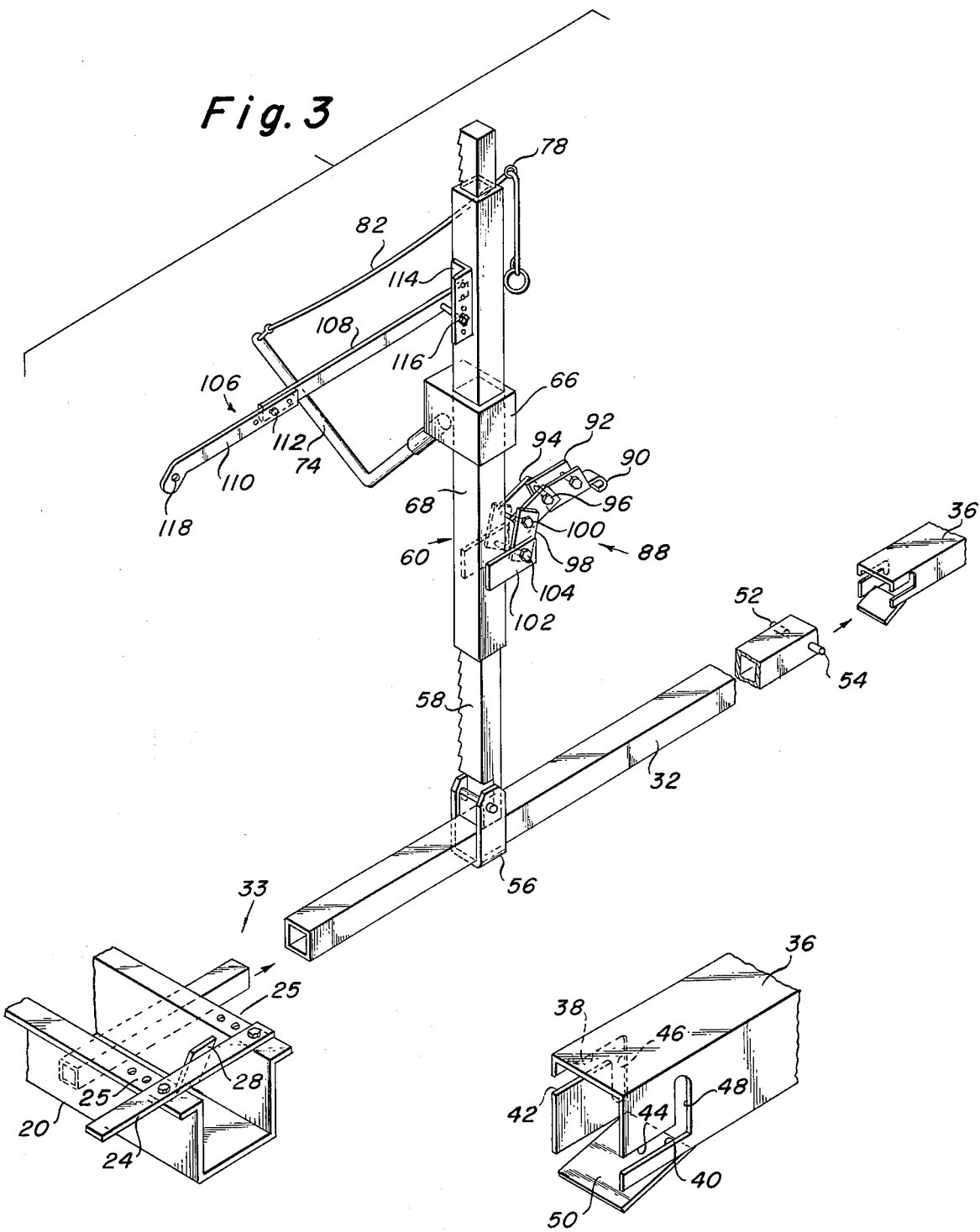
FIG. 3 is a perspective view of several disassembled components of the motorcycle rack.
FIG. 4 is a perspective view of a socket member used to connect the motorcycle to the underbody of the carrying vehicle.

Extending from the track 20 to the underbody of the carrying vehicle are two generally vertically disposed elongated support members 30 and 32 which are hollow and rectangular in cross-sectional configuration. Each is connected to the track 20 through a socket and insert type connection. Such a connection 33 is shown in FIG. 3 for support member 32. A lock for this connection (not shown) can be used. The support members are disposed in parallel, spaced relation to one another. Each is connected to the underbody of the carrying vehicle at an end at any point which will provide support for the weight of the rack and motorcycle, the connection being made to some part of the vehicle chassis or frame. The connection of support member 32 with the carrying vehicle is shown at 34.

The following discussion will deal only with the support member 32. The description is equally applicable to support member 30. Permanently affixed to the underbody of the carrying vehicle is a socket member 36 shown in detail in FIG. 4. The socket member is rectangular in cross-section and has two slots at 38 and 40 cut into its vertical walls. The slots are L-shaped, having first linear portions at 42 and 44 and second linear portions at 46 and 48. The two first linear portions extend longitudinally from the front of the socket but are not situated directly opposite one another. The portion at 42 is cut into one vertical wall of the socket at a point closer to the top of the vertical wall than to the bottom. The portion at 44 is cut into its vertical wall closer to the bottom. However, the second linear portion at 46 extends downward from the first linear portion at 42 while the second linear portion at 48 extends upward from the first linear portion at 44 so that the second linear portions at 46 and 48 are directly opposite one another. At the base of the socket, a panel 50 is cut out and bent downward to facilitate insertion of the support member 32 and to permit the support member to pivot upward and downward about the socket member.

The support member 32 has two pins 52 and 54 protruding from the vertical walls thereof at points midway between the tops and bottoms of their respective vertical walls. The pins are directly opposite one another. The rectangular cross-section of the support member is of a size which will permit insertion into the socket member.

The support member 32 has fitted around it a rectangular bracket 56, the upper portion of which projects above the top of the support member to provide a loop. The base of the vertical suspension member 58 hooks into the loop provided by 56. The vertical suspension member 58 in this embodiment is a jack ratchet shaft.

The vertical suspension member cooperates with the lifting mechanism 60 to raise and lower the support member 32. A similar vertical suspension member 62 and lifting mechanism 64 cooperate to raise and lower the support member 30. Although this description is limited to the vertical suspension member 58 and the lifting mechanism 60, it applies equally to the vertical suspension member 62 and lifting mechanism 64. Together, the two pairs of vertical suspension members and lifting mechanisms acting through the support members 30 and 32 raise and lower the track 20. The lifting mechanism 60 is a jack 66 upon which a housing 68 is positioned. The jack ratchet shaft 58 passes through this housing. To adapt the jack mechanism to its present use without modification, the jack is mounted in an inverted position. When in use, the jack 66 remains in a fixed position relative to the carrying vehicle while the ratchet shaft 58 moves upward or downward through the housing 68, thus raising or lowering the support member 32. This is also the case with the jack 70, its housing 72 and the support member 30.

A coordinating system for simultaneous manipulation of the multiple lifting mechanisms is provided. In the preferred embodiment, the jacks 66 and 70 are manipulated by the jack handles 74 and 76. Attached to the ends of each handle and strung through guides 78 and 80 situated at the top of each jack housing 68 and 72 are lanyards 82 and 84. One operator by pulling the lanyards together can manipulate the jacks simultaneously.

Each lifting mechanism 60 and 64 is connected to the carrying vehicle's bumper 86 by a bumper engager. Only the bumper engager 88 for the lifting mechanism 60 is shown. The ensuing discussion will deal only with this bumper engager but applies equally as well to the bumper engager for the lifting mechanism 64. The bumper engager 88 has a grasping device 90, which here is a hook, connected to a bracket 92. The bracket 92 is hinged to a bracket 94 by a bolt 96. The bracket 94 is hinged to a bracket 98 by a bolt 100. The bracket 98 is hinged to a bracket 102 by a bolt 104. The bracket 102 is welded to the lifting mechanism 60. The term "bumper" is used broadly and may include any kind of horizontal structure on a vehicle which will permit engagement with the grasping device. The grasping device does not require any fittings on the bumper to maintain its position. No bolts are needed. The grasping device is held in place by the weight of the rack and motorcycle which pulls outward and downward. The plurality of hinged brackets 92, 94 and 98 can be set at any angle relative to one another and this configuration can be fixed by tightening the bolts 96, 100 and 104 on which they are hinged. This permits the operator to adjust and lock the hinged brackets 92, 94 and 98 in a configuration which will fit the contour of any bumper. The adjustment feature permits the operator to use the same rack on different vehicles with different bumpers.

Connected to the lifting mechanism 60 is a retention bar 106 adjustable in length through the slideable overlapping interconnection of the two shorter segments 108 and 110 which make up the retention bar 106. A bolt 112 is used to fix the length. The position at which the retention bar connects to the lifting mechanism 60 is also adjustable by repositioning on the plate 114 using a bolt 116. This connection with the lifting mechanism 60 at the plate 114 is hinged. The opposite end 118 of the retention bar contains a fitting for attachment to some point on the upper portion of the motorcycle being carried. This connection is also hinged. The retention bar is shown here as connected to the lifting mechanism 60 but could also be used on the lifting mechanism 64 instead.

OPERATION

When not in use the rack may be disassembled and stored in a suitable place such as in the trunk of the carrying vehicle. The only permanent fittings on the carrying vehicle are the two socket members one of which is shown at 36. In assembling the rack, the support members 30 and 32 are first inserted into their respective socket members. The following description is limited to support member 32 and its socket member 36 but applies equally to support member 30 and its socket member. Since the first linear slot portions at 42 and 44 are not directly opposite one another as are the pins 52 and 54, the operator must twist the support member 32 for insertion into the socket member 36. When the pins 52 and 54 reach the second linear portions at 46 and 48, which are opposite one another, the pins will snap into the second linear portions of the slots and will remain there unless the operator imparts the same positive twisting action to remove the support member by once again engaging the first linear slot portions at 42 and 44 with the pins 52 and 54. This connection can be accomplished by the simple inserting and twisting action without climbing under the carrying vehicle each time to fasten or unfasten any nuts and bolts and is, therefore, easily attachable and removable.

The U-shaped track 20 is then connected to the support members. The two jack and ratchet shaft assemblies 66, 58 and 70, 62 are then mounted on the bumper of the carrying vehicle using their respective bumper engagers, one of which 88 is shown. Speaking only in terms of engager 88, the configuration of the hinged brackets 92, 94 and 98 can be adjusted and then locked by tightening the bolts 96, 100 and 104. The interconnected hinged brackets can thereby be set to fit the contour of any bumper. The adjustment feature permits the operator to use the same rack on vehicles having differently shaped bumpers. The bumper engager for the jack 70 and ratchet shaft 62 is similarly adjustable. The bases of the two ratchet shafts 58 and 62 are then hooked to the rectangular brackets on the support members 30 and 32. The rectangular bracket 56 for support member 32 is shown. The lanyards 82 and 84 are then strung through the guides 78 and 80 and connected to the jack handles 74 and 76.

The now assembled rack is in the lowered loading position. Either one of the two hinged bars 22 and 24 is unloaded and swung out of the way. The motorcycle to be carried is then rolled into the U-shaped track. The bar is swung back and locked across the mouth of the track. If necessary, the distance between the bars 22 and 24 may be adjusted by repositioning the bars using the apertures at 23 and 25. This will prevent any rolling of the motorcycle along the U-shaped track.

The retention bar 106 is then attached to some point on the upper portion of the motorcycle. This retains the motorcycle in an upright position. The length of the bar and its position on the lifting mechanism 60 can be adjusted so that the retention bar will work properly with any size motorcycle.

The rack with the motorcycle on it is now ready to be raised into a carrying position. The operator by pulling the lanyards 82 and 84 together can manipulate the jacks 66 and 70 simultaneously. The jack handles 74 and 76 will spring back after the ratchet shafts 58 and 62 are raised one notch ready to repeat the lifting action. The ability to use both jacks simultaneously permits the operator to always maintain the track 20 in a horizontal plane. This prevents needless tipping of the motorcycle. The two jacks remain in a fixed position relative to the vehicle bumper during the lifting action while their ratchet shafts 58 and 62 move upward lifting the support member 30 and 32 and the track 20.

As the motorcycle is raised into a carrying position, the motorcycle end 118 of the retention bar 106 will move upward with the motorcycle while the rack end of the retention bar, which is attached to a jack housing, will remain in a fixed position. Since the retention bar has been set at a fixed length, the motorcycle will be tilted closer to the carrying vehicle and held in a more fixed position relative to the carrying vehicle because the retention bar will incline more and more steeply pulling the motorcycle inward and holding it more firmly in the U-shaped track as the motorcycle is raised. Besides holding the motorcycle in a closer, more fixed position relative to the carrying vehicle, the retention bar acts to keep the motorcycle from jumping out of the U-shaped track while the carrying vehicle is in motion.

When in a raised position the support members 30 and 32 should contact some point on the underbody of the carrying vehicle away from their connections to the underbody. The support member 32 in FIG. 1 is shown as contacting the base of the bumper at 120. While the carrying vehicle is at rest, the rack is held in position by its own weight tacting through the bumper engagers, one of which 88 is shown. When the carrying vehicle is in motion, the rack could jump off the bumper if jolted sufficiently by a rough ride. This is prevented by the additional contacts of the support members with the undercarriage of the carrying vehicle which will prevent any further upward movement.

The rack of this invention has been represented as mounted on the back of a car but any sort of vehicle may be used with this rack such as a truck, trailer, camper, etc.

I claim:

1. A rack for carrying a motocycle on a vehicle having a bumper, comprising:
   (a) motorcycle support means having a track on which a motorcycle is supported in an upright position
   (b) elongated pivotal support means extending under the vehicle and below the bumper between the vehicle and the motorcycle support means for providing pivotal support for the motorcycle support means
   (c) lifting means including a housing enclosing an elongated reciprocably movable lifting member for raising the motorcycle support means and holding it in position
   (d) the housing disposed immediately behind and adjacent the bumper
   (e) the lower end of the elongated reciprocable lifting member connected to the elongated support means
   (f) readily positionable and removable bumper grasping means pivotally connected to the housing of the lifting means and having an element which readily grasps and can be positioned on the vehicle bumper to provide support for the lifting means, and
   (g) motorcycle retaining means attached to the housing of the lifting means for engaging and holding the motorcycle in fixed rigid position on the motorcycle support means.

2. A rack for carrying a motorcycle on a vehicle having a bumper, comprising:
   (a) motorcycle support means having a track on which a motorcycle is supported in an upright position
   (b) lifting means connected between the motorcycle support means and the vehicle bumper for raising the motorcycle support means
   (c) readily disengageable bumper engaging means integrally connected to the lifting means for engaging the bumper and providing support for the lifting means
   (d) the motorcycle support means including at least one elongated support member connected at one end to the track and having a free end which extends under the vehicle
   (e) the free end of the elongated support member including a coupling element
   (f) a second coupling element disposed on the under portion of the vehicle remote from the end thereof and in alignment with the coupling element on the elongated support member
   (g) the coupling elements being constructed to be readily moved axially into engagement with respect to each other and remotely interlocked to form a pivotal connection between the vehicle and the elongated support member which precludes unintended disengagement.

3. The rack as recited in claim 2 wherein:
   (a) one of the coupling elements includes an outwardly extending pin; and
   (b) the other coupling element includes pin receiving means into which the pin is received for locking engagement.

4. The rack as recited in claim 2 wherein:
   (a) the elongated support member coupling element includes an outwardly extending pin which extends beyond the opposite sides of the elongated support member adjacent the free end thereof;
   (b) the coupling element on the vehicle includes a socket member having open elongated slots which extend rearwardly from the forward edge of the socket for receiving the pin on the free end of the elongated support member, the elongated slots being horizontally spaced from each other; and
   (c) at least one of the slots having a pin holding and retaining section.

5. A rack for carrying a motorcycle on a vehicle having a bumper, comprising:
   (a) motorcycle support means having a track on which a motorcycle is supported in an upright position
   (b) remotely connectable coupling means for pivotally and removably interlocking the motorcycle support means with the carrying vehicle
   (c) a ratchet type jack disposed adjacent the bumper of the vehicle which has a housing within which a reciprocable shaft is mounted
   (d) a lower end of the reciprocable shaft capable of exerting an upward pull and being connected to the motorcycle support means for controlling the raising and lowering thereof
   (e) bumper engaging means connected to the housing of the ratchet type jack for supporting it in a substantially vertical position beside the bumper, and (f) the bumper engaging means having a grasping element and a plurality of interconnected hinged brackets, the grasping element engaging the top edge of the vehicle bumper, and the hinged brackets fitting the contour of the bumper.

6. The rack as recited in claim 5, wherein:
(a) the plurality of interconnected hinged brackets has means for locking the hinged brackets in a fixed position relative to one another to preserve the configuration of a given vehicle bumper.

7. A rack for carrying a motorcycle on a vehicle with a bumper, comprising:
(a) motorcycle support means having a track on which a motorcycle is supported in an upright position
(b) the motorcycle support means including a pair of substantially parallel spaced elongated support members extending perpendicular to the track and under the vehicle
(c) remotely operable coupling means for each elongated support member and including a first engageable element which is attached to the underside of the vehicle, and a second engageable element which is mounted on the elongated support member for providing a remotely engageable pivotal connection between the vehicle and the elongated support member
(d) a vertically disposed inverted ratchet type jack mounted beside the bumper and above each elongated support member
(e) the ratchet type jack having an elongated shaft reciprocably mounted within a housing, the jack being oriented such that an upward pull is exerted by the lower end of the reciprocable shaft, the lower end of the reciprocable shaft being connected to the elongated support member for controlling the raising and lowering thereof
(f) removable bumper engaging means connected to the housing of each inverted ratchet type jack
(g) the elongated shaft of the inverted ratchet type jack being connected to the elongated support member such that the jack is held in a substantially vertical position.

8. The rack as recited in claim 7, wherein:
(a) the jacks have a common coordinating means for simultaneously controlling their operation.

9. The rack as recited in claim 8, wherein:
(a) each jack has an L-shaped arm attached to its actuating mechanism; and
(b) a lanyard is connected to the end of each arm and extends through guides mounted on the jack.

10. The ratchet as recited in claim 7, wherein:
(a) linkage means is pivotally connected at one end to the housing of one of the jacks adjacent the top thereof and has its other end pivotally attached to the motorcycle to be carried so that on raising of the track on which the motorcycle is mounted the end of the link connected to the motorcycle moves in an arc above the end connected to the jack to move the motorcycle inwardly into a locked position with respect to the track and the jack.

11. A rack for carrying a motorcycle on a vehicle with a bumper, comprising:
(a) motorcycle support means having a track on which a motorcycle is supported in an upright position
(b) coupling means for pivotally and removably interlocking the motorcycle support means with the carrying vehicle
(c) vertically disposed lifting means mounted adjacent to the bumper and connected to the motorcycle support means for providing support and raising the motorcycle support means
(d) a lifting means including a jack having a housing and a reciprocably mounted vertical shaft, the lower end of which is connected to the motorcycle support means
(e) bumper engaging means for both removably attaching and removably affixing the housing of the jack to the bumper of the carrying vehicle
(f) linkage means pivotally connected at one end of the upper portion of the motorcycle and at its other end to the housing of the jack for moving the motorcycle inwardly and holding it in a locked and fixed position within the track.

12. The rack as recited in claim 11, wherein:
(a) the linkage means is a single fixed bar which has its end connected to the lifting means held in a fixed vertical position while the end connected to the motorcycle moves in an arc to a point above the end connected to the lifting means to bring the motorcycle into a closer position to the vehicle and to exert a downward force on the motorcycle to hold it within the track.

* * * * *